United States Patent
Zhao et al.

(10) Patent No.: US 12,443,342 B2
(45) Date of Patent: Oct. 14, 2025

(54) METHOD, ELECTRONIC DEVICE, AND COMPUTER PROGRAM PRODUCT FOR COMPRESSING DATA BASED ON SEGMENT IO COUNTS OF RESPECTIVE TIME SEGMENTS FOR A STORAGE AREA

(71) Applicant: Dell Products L.P., Round Rock, TX (US)

(72) Inventors: Chaojun Zhao, Chengdu (CN); Shuangshuang Liang, Zunyi (CN); Yang Zhang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 42 days.

(21) Appl. No.: 18/513,800

(22) Filed: Nov. 20, 2023

(65) Prior Publication Data
US 2025/0138729 A1 May 1, 2025

(30) Foreign Application Priority Data
Oct. 27, 2023 (CN) .......................... 202311414834.2

(51) Int. Cl.
*G06F 3/06* (2006.01)

(52) U.S. Cl.
CPC .......... *G06F 3/0608* (2013.01); *G06F 3/0653* (2013.01); *G06F 3/0673* (2013.01)

(58) Field of Classification Search
CPC ..... G06F 3/0673; G06F 3/0653; G06F 3/0608
See application file for complete search history.

(56) References Cited

U.S. PATENT DOCUMENTS

| | | | |
|---|---|---|---|
| 9,110,857 B1* | 8/2015 | Rostoker | G06F 13/1689 |
| 10,509,769 B1* | 12/2019 | Shilane | G06F 16/24 |
| 12,093,189 B1* | 9/2024 | Saidi | G06F 12/0868 |
| 2016/0371190 A1* | 12/2016 | Romanovskiy | G06F 3/0659 |
| 2017/0046074 A1* | 2/2017 | Wang | G06F 3/0608 |
| 2017/0371593 A1* | 12/2017 | Li | G06F 3/0608 |

(Continued)

OTHER PUBLICATIONS

Wikipedia, "Data Compression," https://en.wikipedia.org/wiki/Data_compression, Nov. 3, 2023, 18 pages.

(Continued)

*Primary Examiner* — Edward J Dudek, Jr.
(74) *Attorney, Agent, or Firm* — Ryan, Mason & Lewis, LLP

(57) ABSTRACT

Embodiments of the present disclosure relate to a method, an electronic device, and a computer program product for compressing data. The method includes determining a plurality of access levels of a plurality of storage areas in a storage space based on a plurality of input/output (IO) counts of the plurality of storage areas in a historical time period. The method further includes determining an access level threshold based on the utilization of the storage space. The method further includes selecting at least one target storage area among the plurality of storage areas based on the plurality of access levels and the access level threshold. The method further includes compressing a plurality of pages in the at least one target storage area. Embodiments of the present disclosure provide a strategy of merging and compression based on a system state, which balances data compression efficiency and system performance.

20 Claims, 8 Drawing Sheets

(56) References Cited

U.S. PATENT DOCUMENTS

2019/0138439 A1* 5/2019 Kwak .................. G06F 3/0679
2019/0235758 A1* 8/2019 Constantinescu ..... G06F 3/0643
2022/0121386 A1* 4/2022 Hsu ....................... G06F 3/0608
2022/0342596 A1* 10/2022 Kamran ................ G06F 3/0659
2024/0354299 A1* 10/2024 Lee ....................... G06F 16/282

OTHER PUBLICATIONS

Dell EMC, "Dell EMC Unity: Compression," White Paper, Mar. 2018, 39 pages.
Dell EMC, "Dell EMC Unity: Compression for File," A How-To-Guide, Mar. 2018, 18 pages.
Dell EMC, "Dell Unity: How to Use Data Reduction and Compression—Considerations and Best Practices," Article No. 000022795, https://www.dell.com/support/kbdoc/en-us/article/lkbprint?ArticleNumber=000022795&AccessLevel=10&Lang=en, Dec. 12, 2022, 2 pages.

* cited by examiner

METHOD, ELECTRONIC DEVICE, AND COMPUTER PROGRAM PRODUCT FOR COMPRESSING DATA BASED ON SEGMENT IO COUNTS OF RESPECTIVE TIME SEGMENTS FOR A STORAGE AREA

RELATED APPLICATION

The present application claims priority to Chinese Patent Application No. 202311414834.2, filed Oct. 27, 2023, and entitled "Method, Electronic Device, and Computer Program Product for Compressing Data," which is incorporated by reference herein in its entirety.

FIELD

Embodiments of the present disclosure relate to the field of data storage, and more particularly, to a method, an electronic device, and a computer program product for compressing data.

BACKGROUND

Compression is a technique widely used in the storage and data protection industries to reduce the amount of storage space required to store data. Typically, data is independently compressed in a single data block (e.g., 4 KB in size) during flushing. However, with the ongoing development of storage technology, more and more storage space is provided, and more and more data is allocated for storage. In view of this, a cumulative compression technique has been developed. In this technique, in order to obtain a better compression ratio, a plurality of data blocks will be merged and compressed together.

Usually, the data blocks to be merged comprise respective data pages. After merging and compression, a plurality of pages are compressed into a new data block. At this point, if it is intended to access the compressed pages again, a user needs to decompress the compressed data block, and may need to perform data block movement, reorganization, recompression, and metadata update thereafter.

SUMMARY

Embodiments of the present disclosure provide a solution for compressing page data in a storage space.

In a first aspect of the present disclosure, a method for compressing data is provided. The method includes determining a plurality of access levels of a plurality of storage areas in a storage space based on a plurality of input/output (IO) counts of the plurality of storage areas in a historical time period. The method further includes determining an access level threshold based on the utilization of the storage space. The method further includes selecting at least one target storage area among the plurality of storage areas based on the plurality of access levels and the access level threshold. The method further includes compressing a plurality of pages in the at least one target storage area.

In a second aspect of the present disclosure, an electronic device is provided. The electronic device includes a processor; and a memory coupled with the processor and having instructions stored therein, wherein the instructions, when executed by the processor, cause the electronic device to perform actions. The actions include determining a plurality of access levels of a plurality of storage areas in a storage space based on a plurality of IO counts of the plurality of storage areas in a historical time period. The actions further include determining an access level threshold based on the utilization of the storage space. The actions further include selecting at least one target storage area among the plurality of storage areas based on the plurality of access levels and the access level threshold. The actions further include compressing a plurality of pages in the at least one target storage area.

In a third aspect of the present disclosure, a computer program product is provided. The computer program product is tangibly stored on a non-transitory computer-readable medium and includes machine-executable instructions that, when executed by a machine, cause the machine to perform actions. The actions include determining a plurality of access levels of a plurality of storage areas in a storage space based on a plurality of IO counts of the plurality of storage areas in a historical time period. The actions further include determining an access level threshold based on the utilization of the storage space. The actions further include selecting at least one target storage area among the plurality of storage areas based on the plurality of access levels and the access level threshold. The actions further include compressing a plurality of pages in the at least one target storage area.

This Summary is provided to introduce the selection of concepts in a simplified form, which will be further described in the Detailed Description below. The Summary is neither intended to recognize key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure. In the accompanying drawings.

DETAILED DESCRIPTION

Principles of the present disclosure will be described below with reference to several example embodiments illustrated in the accompanying drawings. Although the accompanying drawings show illustrative embodiments of the present disclosure, it is to be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" mean "at least one example embodiment." The term "another embodiment" means "at least one additional embodiment." The terms "first," "second," and the like may refer to different or identical objects. Other explicit and implicit definitions may also be included below.

As discussed above, when a user wants to read merged and compressed data, the user needs to decompress the compressed data block again. If the user needs to access the compressed data several times in a short period of time, the time and operation cost of decompression, data block movement, reorganization, recompression, and metadata update will increase exponentially. Therefore, it will bring a great burden to the system. That is, although merging and compression lead to further savings in the storage space, the overhead of the storage system will be increased if the compression-decompression-recompression process is too frequent.

In view of this, an embodiment of the present disclosure provides a solution for compressing data. In this solution, the access "popularity" of a plurality of storage areas in a storage space is determined, and an access level threshold is dynamically selected based on the current capacity of the storage space at the same time. Therefore, the number of pages to be merged and compressed can be adjusted in real time to be adapted to the current usage condition of the storage system by allocating the access "popularity" combined with the dynamic "popularity" threshold, so that the burden on the system can be minimized while ensuring that the storage space meets the use requirements.

Figure 1:
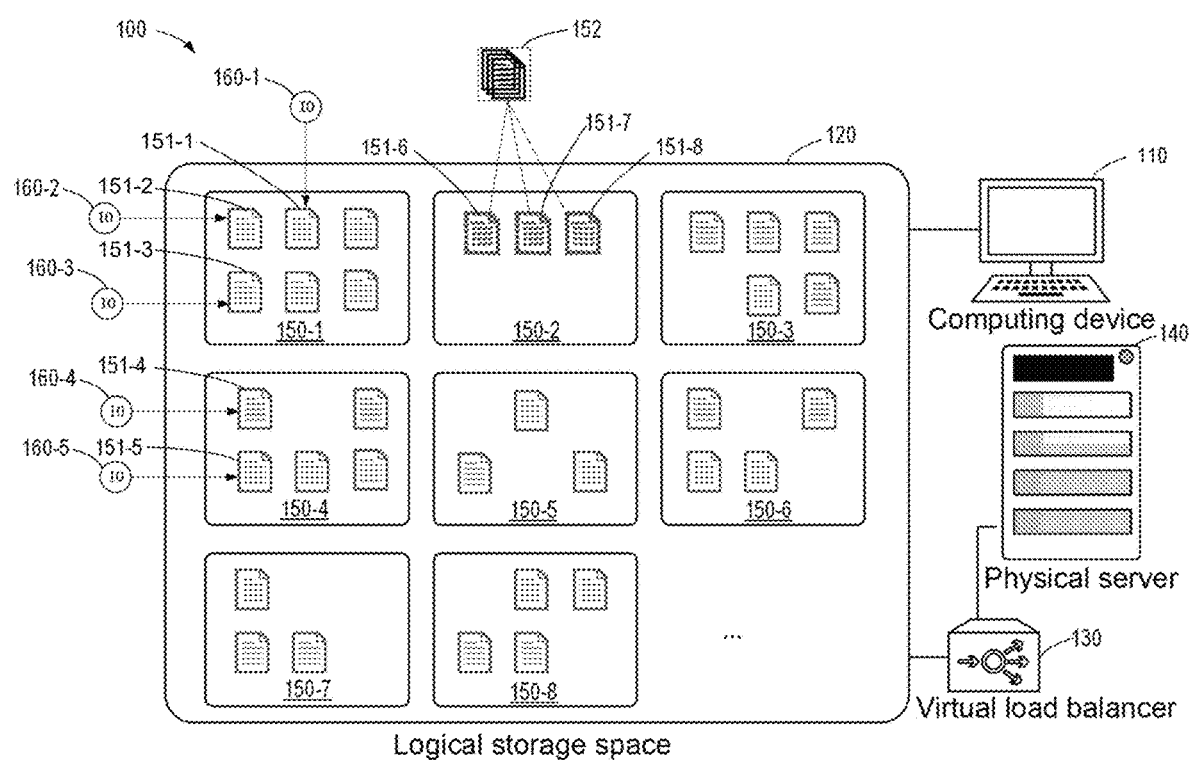
FIG. 1 shows a schematic diagram of a storage system in which an embodiment of the present disclosure can be implemented.

FIG. 1 shows a schematic diagram of a storage system 100 in which an embodiment of the present disclosure can be implemented. As shown in FIG. 1, the storage system 100 includes a computing device 110, for example, for managing a logical storage space 120. The storage system 100 further includes a virtual load balancer (VLB) 130 and a physical server 140 connected to the logical storage space 120 via the VLB 130. Here, the VLB 130 stores the mapping between the logical space in the logical storage space 120 and the physical space in the physical server 140.

In the illustrated embodiment, the logical storage space 120 is divided into a plurality of storage areas, including a storage area 150-1, a storage area 150-2, a storage area 150-3, a storage area 150-4, a storage area 150-5, a storage area 150-6, a storage area 150-7, a storage area 150-8 (separately or collectively referred to as the storage area 150 hereinafter), and so on. For example, the size of the logical storage space 120 may be 1 PB or more, where PB denotes a petabyte, which is 1000 terabytes (TB) or 1,000,000 gigabytes (GB). Accordingly, each storage area 150 may have the same size, which may be 2 GB.

In each storage area 150, a plurality of pages are stored. As shown in FIG. 1, the storage area 150-1 includes 6 pages; the storage area 150-2 includes 3 pages; the storage area 150-3 includes 5 pages; the storage area 150-4 includes 5 pages; the storage area 150-5 includes 3 pages; the storage area 150-6 includes 4 pages; the storage area 150-7 includes 3 pages; and the storage area 150-8 includes 4 pages. Data in the pages is written by a user and may also be read later.

For example, in a time period, the computing device 110 receives the user's access instruction, that is, an input/output (IO) instruction 160-1, for a page 151-1, an IO instruction 160-2 for a page 151-2, and an IO instruction 160-3 for a page 151-3, in the storage area 150-1. In the same time period, the computing device 110 receives the user's IO instruction 160-4 for a page 151-4 and an IO instruction 160-5 for a page 151-5, in the storage area 150-4. In addition, in the same time period, the computing device 110 does not receive any IO instruction from the user for pages in the storage area 150-2. At this time, the computing device 110 can determine that the IO count of the storage area 150-1 is 3, the IO count of the storage area 150-4 is 2, and the IO count of the storage area 150-2 is 0. Based on this, the computing device 110 can determine that the user's access level to the data in the storage area 150-1 is high, and is higher than that to the data in the storage areas 150-4 and 150-2. Thus, the computing device 110 can infer that the probability of the user accessing the storage area 150-1 in the future is greater than the probability of accessing the storage area 150-4, and can infer that the user is unlikely to access the data in the storage area 150-2. Based on these inferences, the computing device 110 merges and compresses pages 151-6, 151-7, and 151-8 of the storage area 150-2 to obtain a data block 152 having a smaller volume.

It should be understood that the embodiment shown in FIG. 1 only generally illustrates the solution for compressing data according to an embodiment of the present disclosure. Here, the access level of a storage area and the criteria for selecting data to be compressed are only examples. The solution for compressing data according to an embodiment of the present disclosure will be described in detail below with reference to FIGS. 2 to 6.

Figure 2:
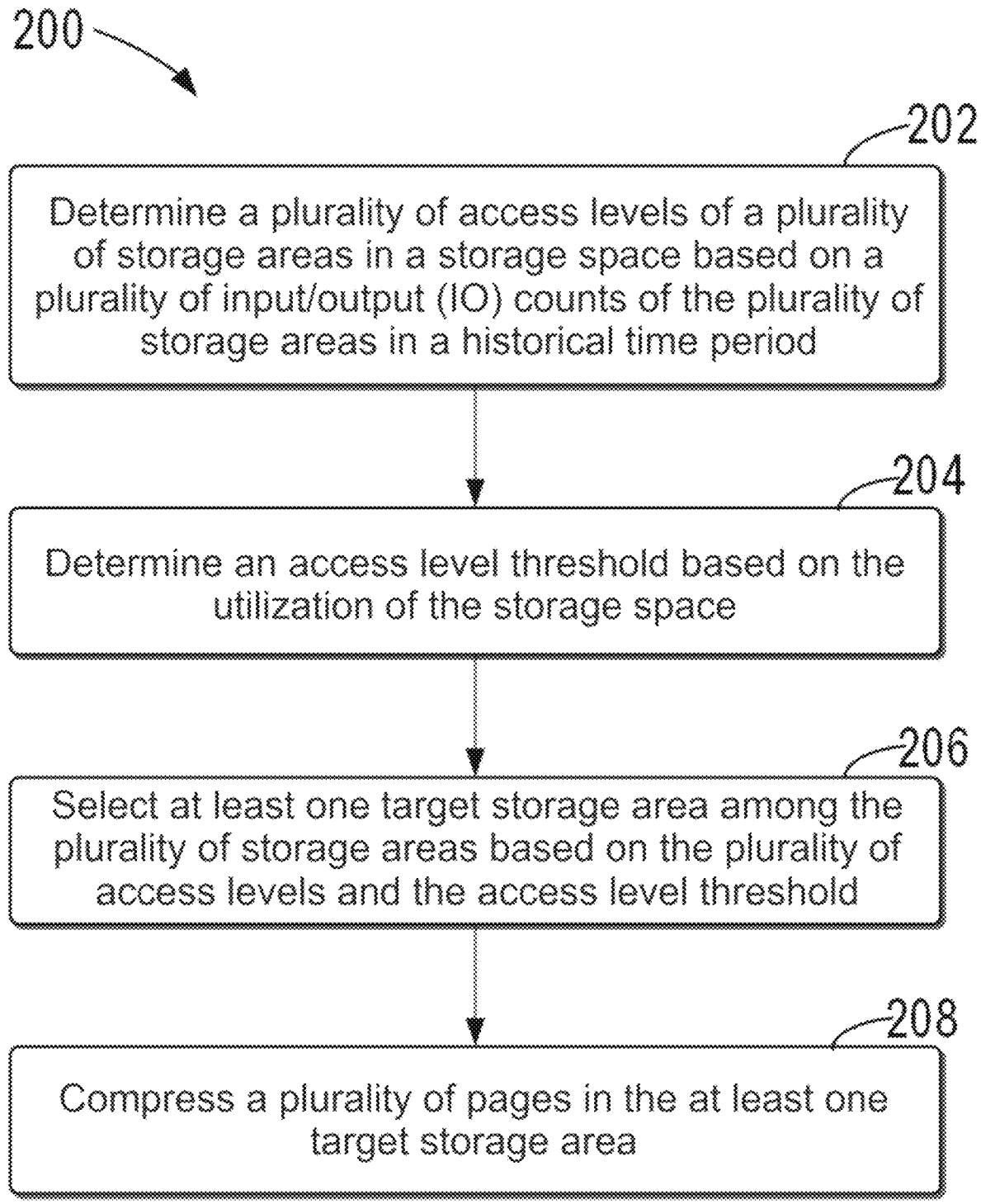
FIG. 2 shows a flow chart of an example method for compressing data according to an embodiment of the present disclosure.

FIG. 2 shows a flow chart of an example method 200 for compressing data according to an embodiment of the present disclosure. For discussion purposes, the method 200 will be described in conjunction with FIG. 1. For example, the method 200 may be performed by the computing device 110 in FIG. 1.

As shown in FIG. 2, at 202, a plurality of access levels of a plurality of storage areas in a storage space are determined based on a plurality of IO counts of the plurality of storage areas in a historical time period. For example, in the embodiment shown in FIG. 1, the computing device 110 can determine a plurality of access levels of a plurality of storage areas 150 in the logical storage space 120 based on a plurality of IO counts of the plurality of storage areas 150 in a historical time period. Here, the access level indicates the frequency at which a storage area is accessed within a period of time. The access level may be an index that characterizes the probability that the storage area will be accessed at a future time not far from the current time. In some embodiments, the access level may be an IO count for a storage area per unit time. An example for determining the access level will be described in detail later with reference to FIGS. 3A-3B.

At 204, an access level threshold is determined based on the utilization of the storage space. For example, in the embodiment shown in FIG. 1, the computing device 110 may determine the access level threshold based on the utilization of the logical storage space 120. The access level threshold is used to distinguish between storage areas that should be compressed and storage areas that should not be compressed. The access level threshold may be associated with the current utilization of the logical storage space 120.

For example, when the utilization of the logical storage space 120 is high, that is, when the used storage space is large, the access level threshold may be selected to be close to the maximum access level. In contrast, when the utilization of the logical storage space 120 is low, that is, the used storage space is small, the access level threshold may be selected to be close to the minimum access level.

In some embodiments, the data compression strategy according to embodiments of the present disclosure may include a capacity mode and a performance mode. For example, the computing device 110 may select the capacity mode or the performance mode according to the idle capacity of the system, as indicated, for example, by a System Water Mark (SWM). The SWM can describe the available space state of the system and is defined as the ratio of the used space of the storage space to the total capacity of the system.

In this embodiment, when the SWM is lower than a designated low water mark (LWM), this means that there is sufficient available space in the storage space, and there is no need to merge and compress a large number of pages. At this time, the computing device can choose the performance mode, that is, only pages with a very low access level will be merged and compressed. In this way, pages with a high access level can be prevented from being merged and compressed, thereby reducing the negative impact on the performance of the storage system. When the SWM exceeds the LWM but is lower than a designated high water mark (HWM), this means that the available space of the storage space begins to decrease. The computing device 110 will choose the capacity mode. With the increase of the SWM, more pages with a low access level will be merged and compressed. When the SWM is higher than the HWM, it means that the available space of the storage space tends to be exhausted, which means that customers pay more attention to the size of available space at this time. At this time, except for individual pages with the highest access level, all other pages will be merged and compressed.

At 206, at least one target storage area is selected among the plurality of storage areas based on the plurality of access levels and the access level threshold. For example, in the embodiment shown in FIG. 1, the computing device 110 may select at least one target storage area among the plurality of storage areas 150 based on a plurality of access levels and the access level threshold. After the computing device 110 selects an access level threshold suitable for the current operation state of the storage space according to the utilization, the computing device 110 can select the storage area 150 with an access level greater than the access level threshold as the target storage area to compress the pages stored therein.

At 208, a plurality of pages in the at least one target storage area are compressed. For example, in the embodiment shown in FIG. 1, the computing device 110 may compress a plurality of pages in the at least one target storage area into a plurality of data blocks. In the embodiment shown in FIG. 2, the access levels of the storage areas are determined based on the IO counts, so that the storage areas are sorted according to the access levels. At the same time, the data to be compressed is dynamically selected according to the current operation status of the storage space. In this way, unnecessary compression/decompression operations can be avoided, and as much available space as possible can be reserved, thus balancing the capacity and overall performance of the storage system.

In some embodiments, the storage system may be a log-based system. In this system, when a user deletes existing data and writes new data, the stored data blocks are usually not overwritten, and instead, new data blocks are allocated to store the new data. At this point, the original data blocks will fail, that is, become "holes." In view of this, a backend program (such as a garbage collection program) is provided to deal with these holes, so as to release the fragmented space of the system. In this program, a specific process will be performed on the merged and compressed data blocks, that is, the merged and compressed data blocks will be decompressed, the invalid part (i.e., the data that should be deleted) in the data blocks will be removed, and then the remaining parts will be connected and compressed again. Compared with a single compressed block, the overhead of data removal and splicing is increased. After long-term use, the storage system will have more fragments (i.e., a large number of holes). Especially when the available space in the system is insufficient, this process leads to the performance loss of the system since more data and metadata operations are needed.

In this regard, in some embodiments of the present disclosure, the computing device also selects the pages to be merged and compressed according to the storage locations of pages in the target storage area. For example, when the computing device 110 compresses a plurality of pages in at least one target storage area, the computing device 110 may group the plurality of pages into a plurality of groups of pages to be compressed based on the storage relationship between the storage locations of the plurality of pages. After that, the computing device 110 can respectively compress each of the plurality of groups of pages to be compressed into a data block.

When the pages in the target storage area meet a predetermined storage relationship, these pages will be grouped into one group. For example, the storage relationship may be that logical storage locations of the pages to be compressed are contiguous. The storage relationship may also be that the pages to be compressed are located in the same storage area. The storage relationship may also be that the pages to be compressed are associated with the same write operation. Here, the pages to be compressed are included in an IO instruction from the user. The storage relationship may also be that the pages to be compressed are located in the same intermediate dump area, that is, for example, in the VLB 130 in FIG. 1. Therefore, the pages whose storage addresses are offset closer to one another can be merged and compressed together to avoid the overhead caused by the user deleting individual pages in the compressed block.

Figure 3A:
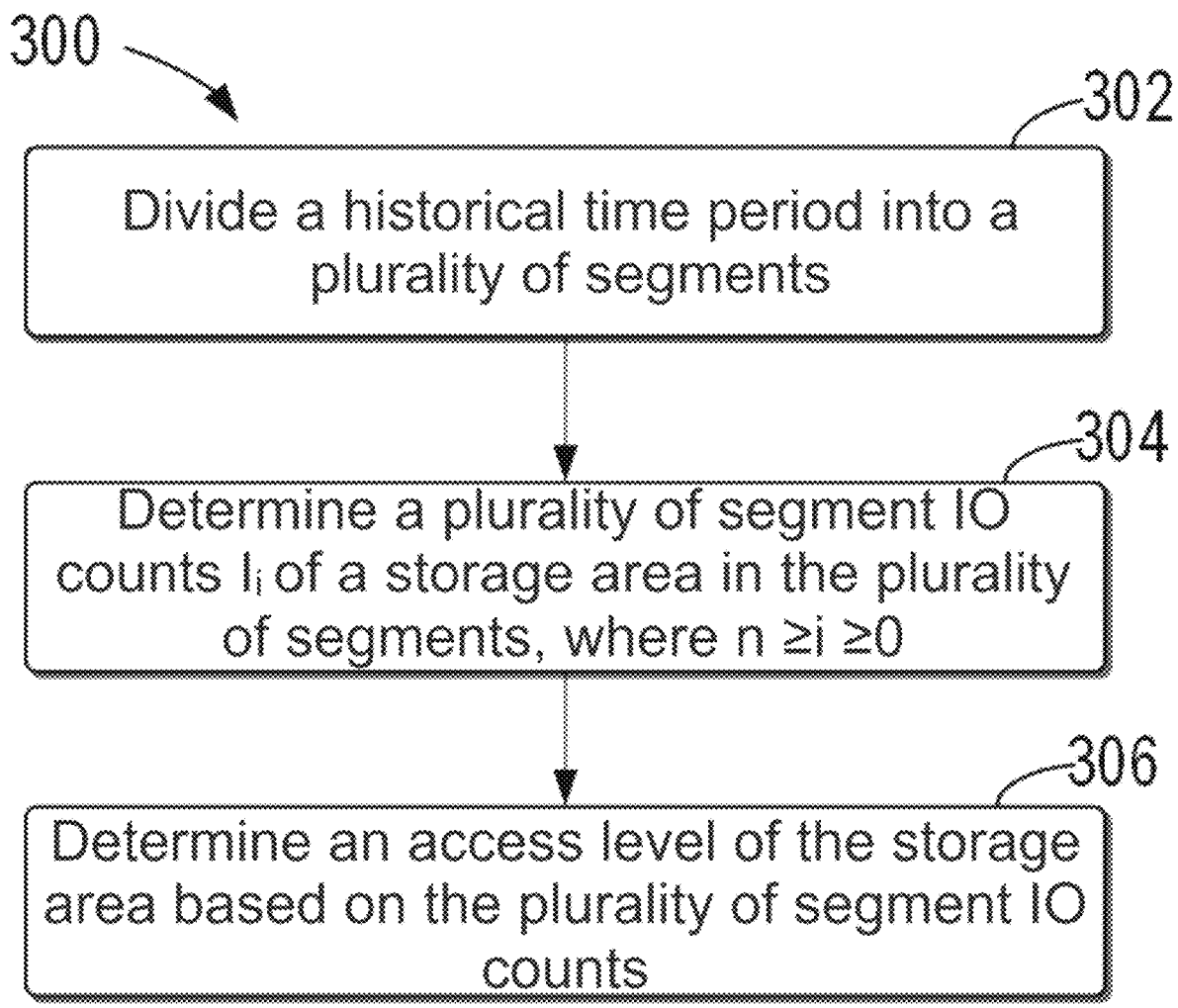
FIGS. 3A-3B show flow charts of an example method for determining an access level according to an embodiment of the present disclosure.

FIG. 3A shows a flow chart of an example method 300 for determining an access level according to an embodiment of the present disclosure. For discussion purposes, the method 300 will be described in conjunction with FIG. 1. For example, the method 300 may be performed by the computing device 110 in FIG. 1.

As shown in FIG. 3A, at 302, the computing device 110 divides the historical time period into a plurality of segments. In some embodiments, the historical time period may be a time period from a specific historical time point to the current time. Here, the computing device 110 can divide from the starting time point according to a fixed duration. Thus, the last time segment may have a different length from the previous time segments. In some embodiments, the computing device 110 can automatically and periodically perform the determination of the access level at the end of the time segmentation according to a fixed duration, thus avoiding different lengths of the time segments.

At 304, the computing device 110 determines a plurality of segment IO counts of a first storage area among the plurality of storage areas in the plurality of segments. The computing device 110 may associate the recorded IO count statistics with corresponding time segments.

At 306, the computing device 110 determines a first access level of the first storage area based on the plurality of segment IO counts. In some embodiments, the computing device 110 may determine to weight all segment IO counts. Here, the weight of each segment IO count can be determined by viewing the historical distribution of IO counts. In this way, by analyzing the historical IO counts segment by segment, a more realistic access level can be inferred.

Figure 4:
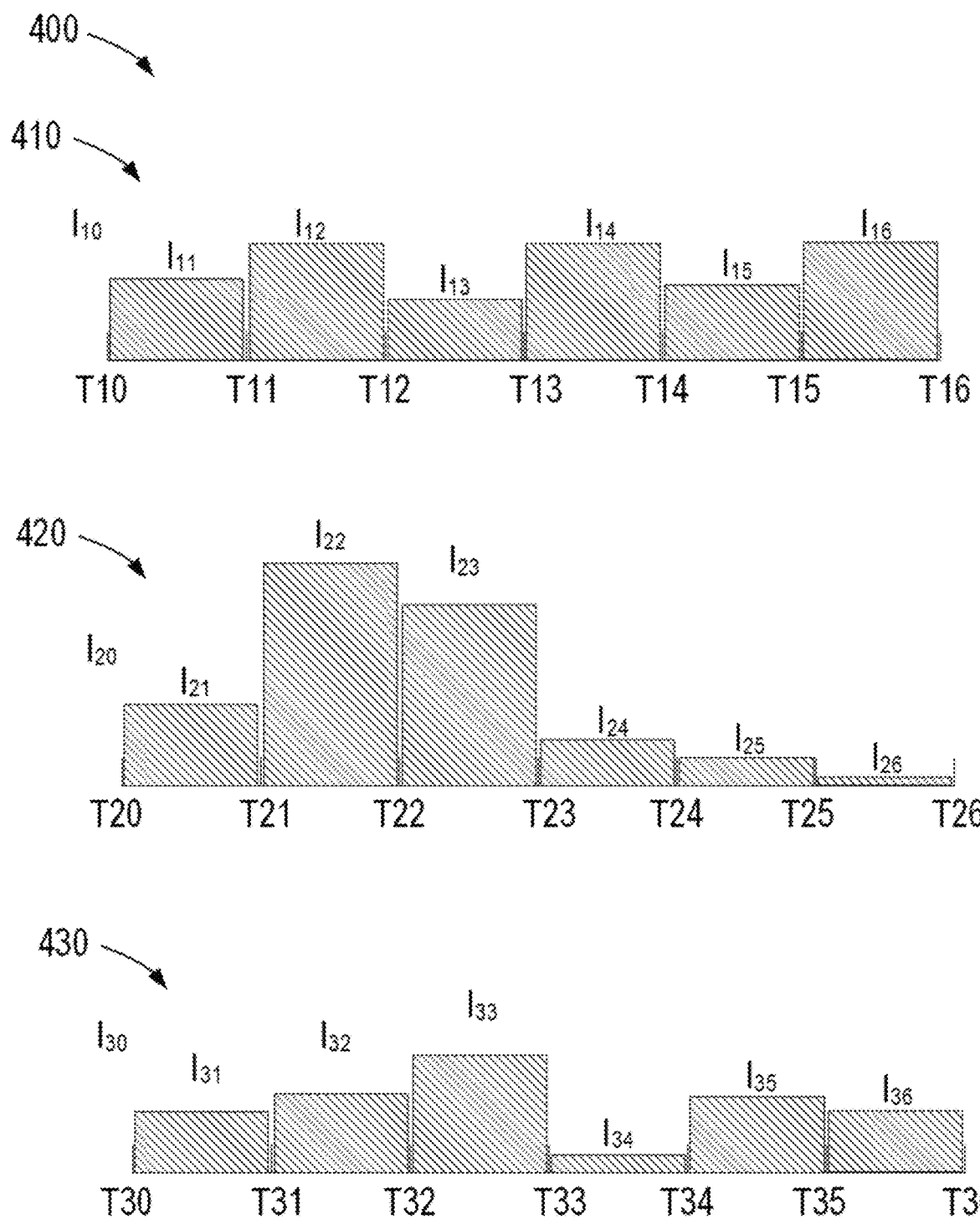
FIG. 4 shows a schematic diagram of historical IO count statistics according to some embodiments of the present disclosure.

The historical IO count distribution will be described in detail below with reference to FIG. 4. FIG. 4 shows a schematic diagram of historical IO count statistics 400 according to some embodiments of the present disclosure. The historical IO count statistics 400 include a historical IO count distribution 410 for, for example, the storage area 150-1 in FIG. 1, a historical IO count distribution 420 for, for example, the storage area 150-2 in FIG. 1, and a historical IO count distribution 430 for, for example, the storage area 150-3 in FIG. 1.

As shown in FIG. 4, the historical IO count distribution 410 starts from the historical time point T10 and continues until the current time point T16, and includes a time segment [T10, T11], a time segment [T11, T12], a time segment [T12, T13], a time segment [T13, T14], a time segment [T14, T15], and a time segment [T15, T16]. The segment IO count in the time segment [T10, T11] is $I_{11}$. The segment IO count in the time segment [T11, T12] is $I_{12}$. The segment IO count in the time segment [T12, T13] is $I_{13}$. The segment IO count in the time segment [T13, T14] is $I_{14}$. The segment IO count in the time segment [T14, T15] is $I_{15}$. The segment IO count in the time segment [T15, T16] is $I_{16}$.

It can be seen from the figure that the values of the segment IO count $I_{11}$, segment IO count $I_{13}$, and segment IO count $I_{15}$ are similar, and the values of the segment IO count $I_{12}$, segment IO count $I_{14}$, and segment IO count $I_{16}$ are similar. Thus, the computing device can infer that the access level of the storage area changes periodically. For example, the storage area may be accessed multiple times during the day but be accessed less at night. Thus, when determining weights, the computing device can set the weight of a historical segment corresponding to the current time to be higher than the weight of a historical segment not corresponding to the current time. For example, when calculating the access level of the time segment [T15, T16], the weights of the time segment [T11, T12] and time segment [T13, T14] may be set higher than those of other time segments.

As shown in FIG. 4, the historical IO count distribution 420 starts from the historical time point T20 and continues until the current time point T26, and includes a time segment [T20, T21], a time segment [T21, T22], a time segment [T22, T23], a time segment [T23, T24], a time segment [T24, T25], and a time segment [T25, T26]. The segment IO count in the time segment [T20, T21] is $I_{21}$. The segment IO count in the time segment [T21, T22] is $I_{22}$. The segment IO count in the time segment [T22, T23] is $I_{23}$. The segment IO count in the time segment [T23, T24] is $I_{24}$. The segment IO count in the time segment [T24, T25] is $I_{25}$. The segment IO count in the time segment [T25, T26] is $I_{26}$.

As can be seen from the figure, the values of the segment IO count $I_{22}$ and segment IO count $I_{23}$ are much higher than those of other time segments. Thus, the computing device can infer that the data in the storage area becomes obsolete after the time point T23 and is unlikely to be accessed. Therefore, when determining weights, the computing device can set the weight of a historical segment that is far away from the current time to be lower than the weight of a historical segment that is close to the current time. For example, when calculating the access level of the time segment [T25, T26], the weights of the time segments [T21, T22] and [T22, T23] may be set lower than those of the time segment [T23, T24], time segment [T24, T25], and time segment [T25, T26].

As shown in FIG. 4, the historical IO count distribution 430 starts from the historical time point T30 and continues until the current time point T36, and includes a time segment [T30, T31], a time segment [T31, T32], a time segment [T32, T33], a time segment [T33, T34], a time segment [T34, T35], and a time segment [T35, T36]. The segment IO count in the time segment [T30, T31] is $I_{31}$. The segment IO count in the time segment [T31, T32] is $I_{32}$. The segment IO count in the time segment [T32, T33] is $I_{33}$. The segment IO count in the time segment [T33, T34] is $I_{34}$. The segment IO count in the time segment [T34, T35] is $I_{35}$. The segment IO count in the time segment [T35, T36] is $I_{36}$.

As can be seen from the figure, the segment IO count distribution in this storage area is random without any fixed rule. It should be understood that due to the characteristics of the stored data, the earlier the stored data is, the lower the probability that it will be accessed. That is, IO at the current time has the greatest impact on, for example, access level or "temperature" of a "leaf," where a leaf denotes a particular portion of a storage space (e.g., a 2 GB space), while IO with a long history has less and less impact on the leaf temperature calculation. Therefore, when determining weights, the computing device can generally set the weight of a historical segment that is far away from the current time to be lower than the weight of a historical segment that is close to the current time.

Figure 3B:
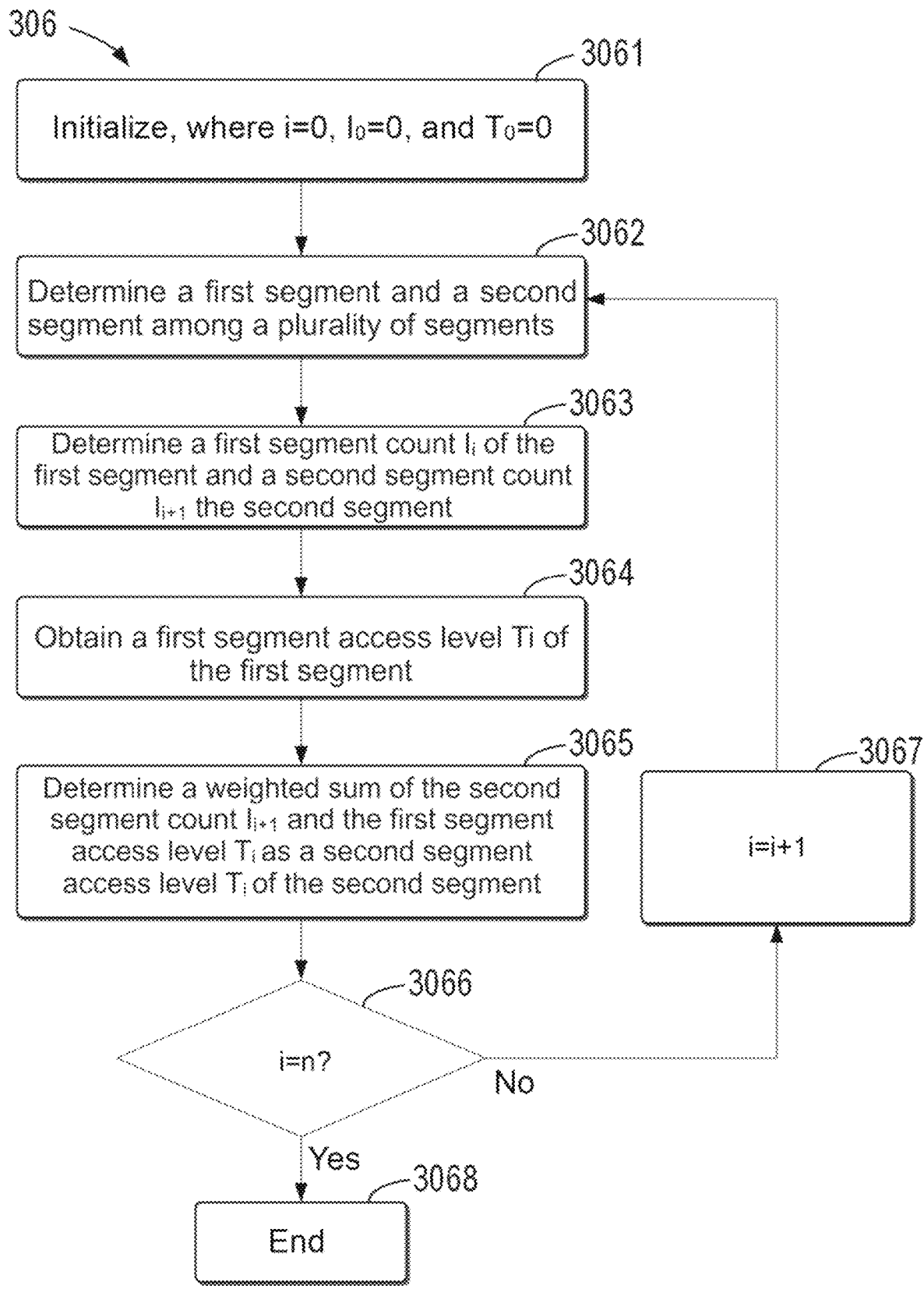

Example techniques for calculating the general access level will be described in detail below with reference to FIG. 3B. FIG. 3B shows a flow chart of an example method 306 for determining an access level according to an embodiment of the present disclosure. For discussion purposes, the method 306 will be described in conjunction with FIG. 1. For example, the method 306 may correspond to the step 306 of the method 300 and be performed by the computing device 110 in FIG. 1.

As shown in FIG. 3B, at 3061, the computing device 110 performs initialization. Here, the computing device 110 sets i, the initial IO base $I_0$, and the access level $T_0$ of the initial time segment to 0. At 3062, the computing device 110 determines a first segment and a second segment that are contiguous among a plurality of segments, and the second segment follows the first segment. At 3063, the computing device 110 determines a first segment count $I_i$ of the first segment and a second segment count $I_{i+1}$ of the second segment. At this time, i=0, and then the first segment count is $I_0$, and the second segment count is $I_1$. At 3064, the computing device 110 obtains a first segment access level $T_i$ of the first segment, that is, $T_0$. At 3065, the computing device 110 determines a second segment access level of the second segment based on the second segment count and the first segment access level. After calculating the access level of the second segment, at 3066, the computing device 110 determines whether the current i is n and whether there are other segments to be calculated. If the computing device 110 determines that the current i is n, the method 306 ends at 3068. If the computing device 110 determines that the current i is not n, the method proceeds to 3067. At 3067, the computing device 110 increases i by 1. At this point, the method 306 returns to 3062.

In some embodiments, when determining the second segment access level of the second segment at 3065, the computing device may determine the second segment access level by calculating a weighted sum of the first segment access level and the second segment count.

In some embodiments, for the general case, the computing device may calculate the access level based on the moving average algorithm. In such an embodiment, the IO count value at the current time point can be given a higher weight, while the weight of the historical time segment decreases exponentially with the increase of time, as shown in, for example:

$$T_n = \alpha \times I_n + (1 - \alpha) \times T_{n-1} \quad (1)$$

where $\alpha$ is the weight, which is a value from 0 to 1, $I_n$ indicates the IO count of the current time segment, $T_{n-1}$ is the access level of the previous time segment, and $T_n$ is the access level of the current time segment.

As can be seen from the equation above, $(1-\alpha) \times T_{n-1}$ can be regarded as attenuation of the access level. Therefore, $(1-\alpha)$ can be obtained by the following prime number attenuation:

$$1 - \alpha = e^{-\lambda \Delta t} \quad (2)$$

where $\lambda$ is the attenuation factor that can be set statistically or empirically.

Thus, it can be obtained that:

$$\alpha = 1 - e^{-\lambda \Delta t} \quad (3)$$

Substituting (3) into (1), the following access level can be obtained:

$$T_n = I_n \times \left(1 - e^{-\lambda \Delta t}\right) + T_{n-1} \times \left(e^{-\lambda \Delta t}\right) \quad (4)$$

In this way, it is possible to obtain the access level that conforms to the characteristics of stored data and improve the compression performance.

Figure 5:
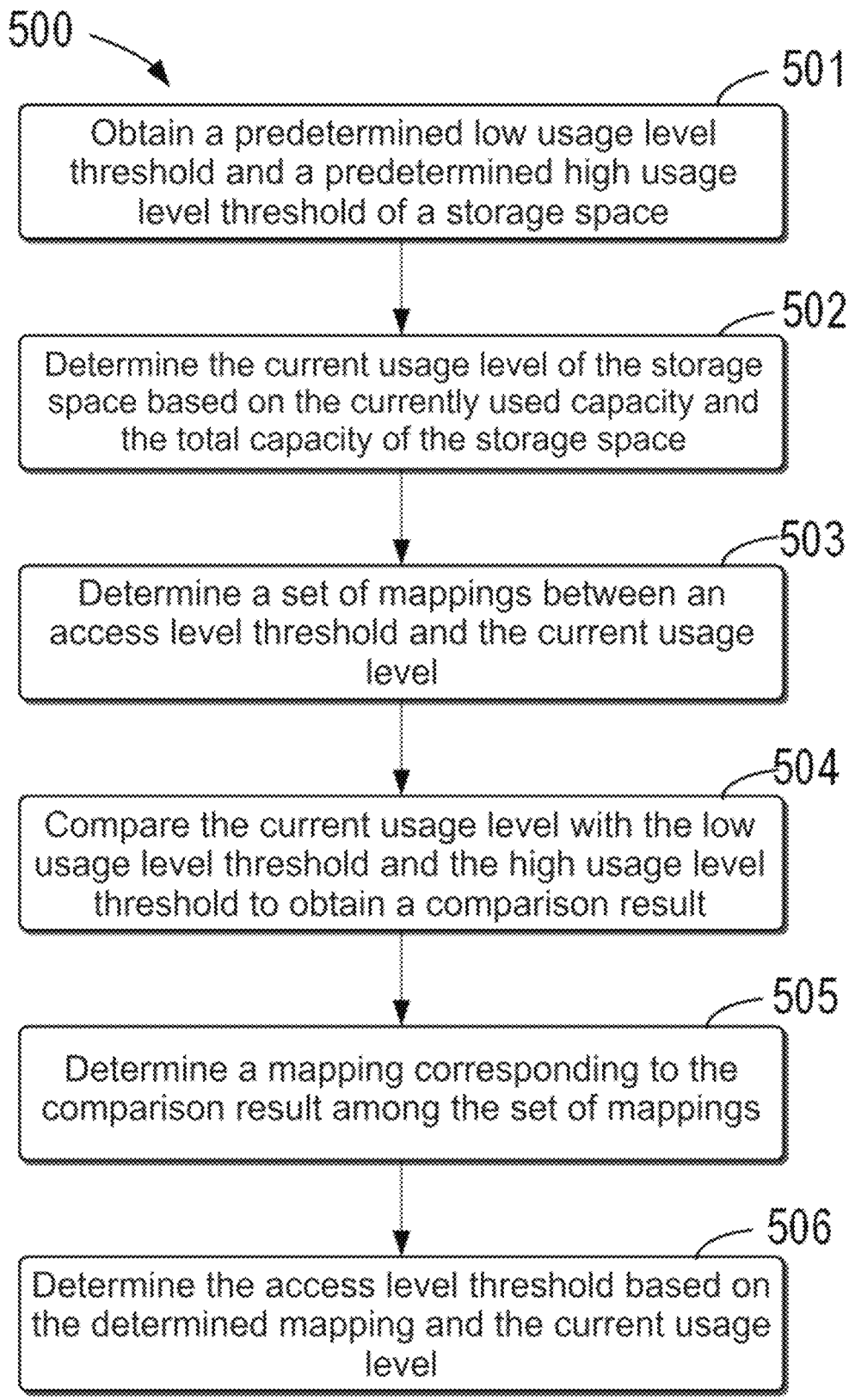
FIG. 5 shows a flow chart of an example method for determining an access level threshold according to an embodiment of the present disclosure.

FIG. 5 shows a flow chart of an example method 500 for determining an access level threshold according to an embodiment of the present disclosure. For discussion purposes, the method 500 will be described in conjunction with FIG. 1. For example, the method 500 may be performed by the computing device 110 in FIG. 1.

At 501, the computing device 110 obtains a predetermined low usage level threshold and a predetermined high usage level threshold of a storage space. At 502, the computing device 110 determines the current usage level of the storage space based on the currently used capacity and the total capacity of the storage space. At 503, the computing device 110 determines a set of mappings between an access level threshold and the current usage level. At 504, the computing device 110 compares the current usage level with the low usage level threshold and the high usage level threshold to obtain a comparison result. At 505, the computing device 110 determines a mapping corresponding to the comparison result among a set of mappings. At 506, the computing device 110 determines the access level threshold based on the determined mapping and the current usage level.

After the access level is obtained, the operation mode of the storage system can be determined by dynamically selecting the access level threshold. The access level threshold is between 0 and 1, which indicates a percentage of the number of all storage areas of the storage system. In some embodiments, there are multiple different mappings between the access level threshold and the current utilization of the storage system. For example, these mappings may include a first mapping, a second mapping, and a third mapping. Here, when the access level threshold is less than the low usage level threshold, the access level threshold has the first mapping with the current usage level. When the access level threshold is greater than the low usage level threshold and less than the high usage level threshold, the access level threshold has the second mapping with the current usage level. When the access level threshold is greater than the high usage level threshold, the access level threshold has the third mapping with the current usage level. The magnitude of increase of the access level threshold with the increase of the current usage level as indicated by the second mapping is greater than that indicated by the first mapping and the third mapping. A mapping will be described below with reference to FIG. 6.

Figure 6:
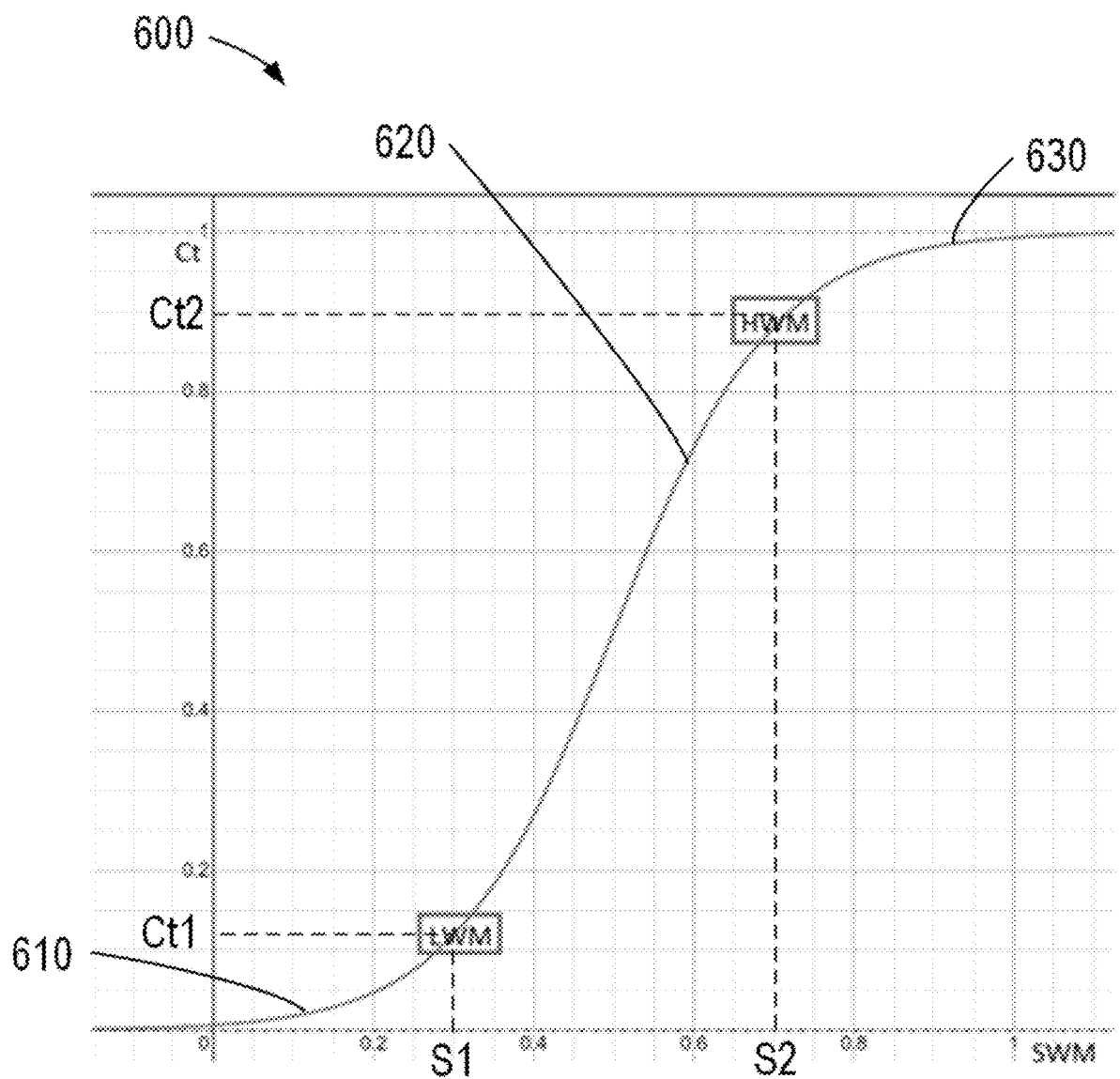
FIG. 6 shows a schematic diagram of example mapping according to an embodiment of the present disclosure.

FIG. 6 shows a schematic diagram of an example mapping 600 between the utilization SWM and the access level threshold Ct according to an embodiment of the present disclosure. As shown in FIG. 6, the abscissa of the mapping 600 is the utilization SWM of the storage space, and the ordinate is the access level threshold Ct. Here, the mapping 600 between the utilization SWM and the access level threshold Ct satisfies the following equation:

$$Ct_{(SWM)} = \frac{L}{1 - e^{(-k(SWM-x0))}} \quad (5)$$

where L is the maximum access level threshold, which is typically 1, k is an adjustable predetermined coefficient, e.g., 10, and x0 is the midpoint and specifically satisfies:

$$x0 = \frac{LWM + HWM}{2} \quad (6)$$

where LWM is the low utilization threshold, and HWM is the high utilization threshold.

In this embodiment, LWM is the usage level S1, and HWM is the usage level S2. The access level threshold Ct corresponding to S1 is Ct1, and the access level threshold Ct corresponding to S2 is Ct2. As shown in FIG. 6, when 0<SWM<LWM, as illustrated by portion 610 of the plotted curve, there is a large amount of available space in the system, and the Ct value will become smaller and grow slowly. Few storage areas are considered to have low access level. When LWM<SWM<HWM, as illustrated by portion 620 of the plotted curve, the available space of the system becomes less and less. The Ct value will increase rapidly so that more storage areas are selected for merging and compression, that is, more space is saved. When HWM<SWM, as illustrated by portion 630 of the plotted curve, the available space of the system is limited. The Ct value is close to 1, which means that most storage areas will go through merging and compression except those with extremely high access level. In this way, the access level threshold that is beneficial to the operation of the storage space can be dynamically determined through the prime number mapping.

Figure 7:
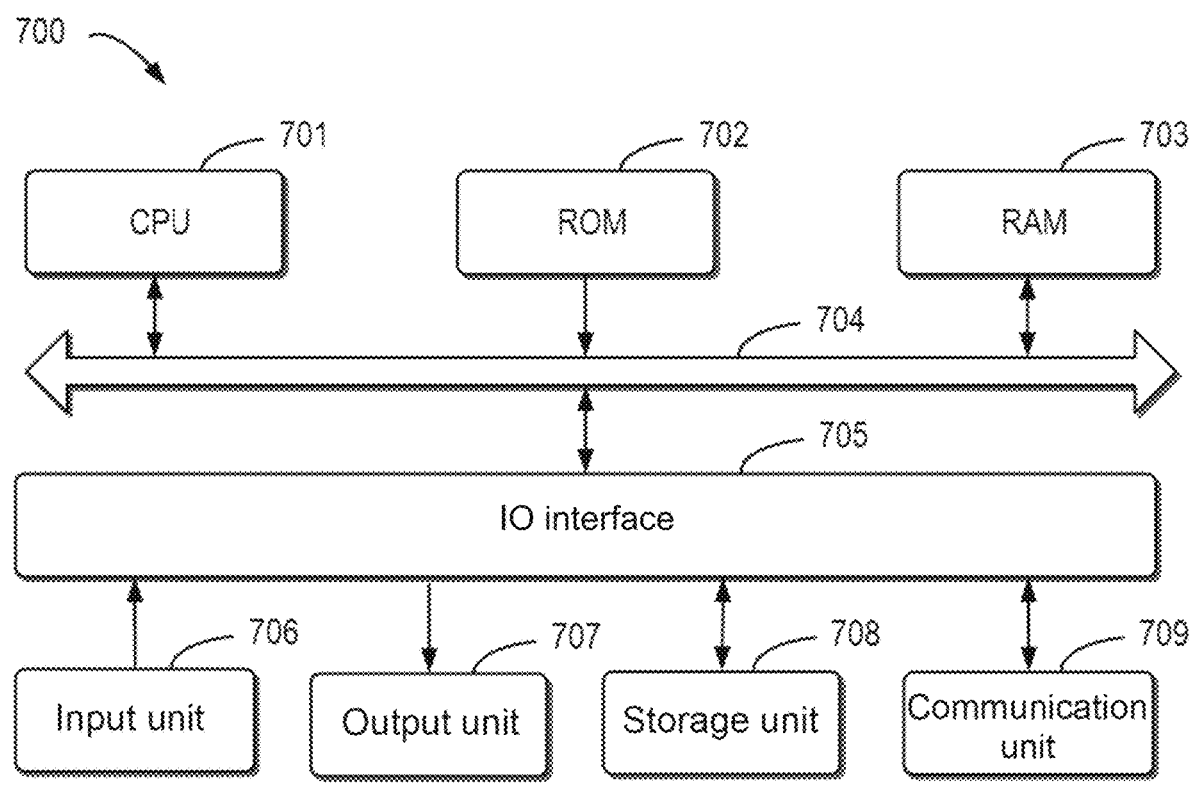
FIG. 7 shows a block diagram of an example device that may be configured to implement embodiments of the present disclosure.

FIG. 7 shows a schematic block diagram of an example device 700 that may be used to implement embodiments of the present disclosure. As shown in FIG. 7, the device 700 includes a central processing unit (CPU) 701 that may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to one another via a bus 704. An IO interface 705 is also connected to the bus 704.

A plurality of components in the device 700 are connected to the IO interface 705 and include: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

Various processes and processing described above, e.g., the methods 200, 300, 306, and 500, may be performed by the CPU 701. For example, in some embodiments, the methods 200, 300, 306, and 500 may be embodied as a computer software program that is tangibly included in a machine-readable medium, such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the methods 200, 300, 306, and 500 described above can be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may maintain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or the other programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored therein includes an article of manufacture that includes instructions that implement various aspects of the functions/actions specified in one or a plurality of blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a storage area of a module, program segment, or instruction, the storage area of a module, program segment, or instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that performs specified functions or actions, or using a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technological improvements, so as to enable persons of ordinary skill in the art to understand the various embodiments disclosed herein.

What is claimed is:

1. A method for compressing data, comprising:
   determining a plurality of access levels of a plurality of storage areas in a storage space based on a plurality of input/output (IO) counts of the plurality of storage areas in a historical time period;
   determining an access level threshold based on utilization of the storage space;
   selecting at least one target storage area among the plurality of storage areas based on the plurality of access levels and the access level threshold; and
   compressing a plurality of pages in the at least one target storage area;
   wherein determining the plurality of access levels of the plurality of storage areas comprises:
   dividing the historical time period into a plurality of segments;
   determining a plurality of segment IO counts of a first storage area among the plurality of storage areas in the plurality of segments; and
   determining a first access level of the first storage area based on the plurality of segment IO counts and one or more corresponding segment access levels.

2. The method according to claim 1, wherein determining the first access level of the first storage area comprises:
   determining a first segment and a second segment that are contiguous among the plurality of segments, the second segment following the first segment;
   determining a second segment count corresponding to the second segment among the plurality of segment IO counts;
   obtaining a first segment access level of the first segment; and
   determining a second segment access level of the second segment based on the second segment count and the first segment access level.

3. The method according to claim 2, wherein determining the second segment access level of the second segment comprises:
   determining a first weight for the first segment access level;
   determining a second weight for the second segment count; and
   determining the second segment access level based on the first weight, the first segment access level, the second weight, and the second segment count.

4. The method according to claim 1, wherein determining the access level threshold comprises:
   obtaining a predetermined low usage level threshold and a predetermined high usage level threshold of the storage space;
   determining a current usage level of the storage space based on a currently used capacity and a total capacity of the storage space; and
   determining the access level threshold based on the low usage level threshold, the high usage level threshold, and the current usage level.

5. The method according to claim 4, wherein determining the access level threshold comprises:
   determining a set of mappings between the access level threshold and the current usage level;
   comparing the current usage level with the low usage level threshold and the high usage level threshold to obtain a comparison result;
   determining a mapping corresponding to the comparison result among the set of mappings; and
   determining the access level threshold based on the determined mapping and the current usage level.

6. The method according to claim 5, wherein the set of mappings comprises a first mapping, a second mapping, and a third mapping,
   wherein the access level threshold has the first mapping with the current usage level when the access level threshold is less than the low usage level threshold, the access level threshold has the second mapping with the current usage level when the access level threshold is greater than the low usage level threshold and less than the high usage level threshold, and the access level threshold has the third mapping with the current usage level when the access level threshold is greater than the high usage level threshold; and
   wherein the magnitude of increase of the access level threshold with the increase of the current usage level as indicated by the second mapping is greater than that indicated by the first mapping and the third mapping.

7. The method according to claim 1, wherein compressing the plurality of pages in the at least one target storage area comprises:
grouping the plurality of pages into a plurality of groups of pages to be compressed based on a storage relationship between storage locations of the plurality of pages; and
respectively compressing each of the plurality of groups of pages to be compressed into a data block.

8. The method according to claim 7, wherein the storage relationship comprises at least one of:
logical storage locations of the pages to be compressed being contiguous;
the pages to be compressed being located in the same storage area;
the pages to be compressed being associated with the same write operation; or
the pages to be compressed being located in a particular intermediate dump area.

9. An electronic device, comprising:
a processor; and
a memory coupled with the processor and having instructions stored therein, wherein the instructions, when executed by the processor, cause the electronic device to perform actions comprising:
determining a plurality of access levels of a plurality of storage areas in a storage space based on a plurality of input/output (IO) counts of the plurality of storage areas in a historical time period;
determining an access level threshold based on utilization of the storage space;
selecting at least one target storage area among the plurality of storage areas based on the plurality of access levels and the access level threshold; and
compressing a plurality of pages in the at least one target storage area;
wherein determining the plurality of access levels of the plurality of storage areas comprises:
dividing the historical time period into a plurality of segments;
determining a plurality of segment IO counts of a first storage area among the plurality of storage areas in the plurality of segments; and
determining a first access level of the first storage area based on the plurality of segment IO counts and one or more corresponding segment access levels.

10. The electronic device according to claim 9, wherein determining the first access level of the first storage area comprises:
determining a first segment and a second segment that are contiguous among the plurality of segments, the second segment following the first segment;
determining a second segment count corresponding to the second segment among the plurality of segment IO counts;
obtaining a first segment access level of the first segment; and
determining a second segment access level of the second segment based on the second segment count and the first segment access level.

11. The electronic device according to claim 10, wherein determining the second segment access level of the second segment comprises:
determining a first weight for the first segment access level;
determining a second weight for the second segment count; and
determining the second segment access level based on the first weight, the first segment access level, the second weight, and the second segment count.

12. The electronic device according to claim 9, wherein determining the access level threshold comprises:
obtaining a predetermined low usage level threshold and a predetermined high usage level threshold of the storage space;
determining a current usage level of the storage space based on a currently used capacity and a total capacity of the storage space; and
determining the access level threshold based on the low usage level threshold, the high usage level threshold, and the current usage level.

13. The electronic device according to claim 12, wherein determining the access level threshold comprises:
determining a set of mappings between the access level threshold and the current usage level;
comparing the current usage level with the low usage level threshold and the high usage level threshold to obtain a comparison result;
determining a mapping corresponding to the comparison result among the set of mappings; and
determining the access level threshold based on the determined mapping and the current usage level.

14. The electronic device according to claim 13, wherein the set of mappings comprises a first mapping, a second mapping, and a third mapping,
wherein the access level threshold has the first mapping with the current usage level when the access level threshold is less than the low usage level threshold, the access level threshold has the second mapping with the current usage level when the access level threshold is greater than the low usage level threshold and less than the high usage level threshold, and the access level threshold has the third mapping with the current usage level when the access level threshold is greater than the high usage level threshold; and
wherein the magnitude of increase of the access level threshold with the increase of the current usage level as indicated by the second mapping is greater than that indicated by the first mapping and the third mapping.

15. The electronic device according to claim 9, wherein compressing the plurality of pages in the at least one target storage area comprises:
grouping the plurality of pages into a plurality of groups of pages to be compressed based on a storage relationship between storage locations of the plurality of pages; and
respectively compressing each of the plurality of groups of pages to be compressed into a data block.

16. The electronic device according to claim 15, wherein the storage relationship comprises at least one of:
logical storage locations of the pages to be compressed being contiguous;
the pages to be compressed being located in the same storage area;
the pages to be compressed being associated with the same write operation; or
the pages to be compressed being located in a particular intermediate dump area.

17. A computer program product tangibly stored on a non-transitory computer-readable medium and comprising machine-executable instructions that, when executed by a machine, cause the machine to perform actions comprising:

determining a plurality of access levels of a plurality of storage areas in a storage space based on a plurality of input/output (IO) counts of the plurality of storage areas in a historical time period;

determining an access level threshold based on utilization of the storage space;

selecting at least one target storage area among the plurality of storage areas based on the plurality of access levels and the access level threshold; and compressing a plurality of pages in the at least one target storage area;

wherein determining the plurality of access levels of the plurality of storage areas comprises:

dividing the historical time period into a plurality of segments;

determining a plurality of segment IO counts of a first storage area among the plurality of storage areas in the plurality of segments; and determining a first access level of the first storage area based on the plurality of segment IO counts and one or more corresponding segment access levels.

18. The computer program product according to claim 17, wherein determining the first access level of the first storage area comprises:

determining a first segment and a second segment that are contiguous among the plurality of segments, the second segment following the first segment;

determining a second segment count corresponding to the second segment among the plurality of segment IO counts;

obtaining a first segment access level of the first segment; and determining a second segment access level of the second segment based on the second segment count and the first segment access level.

19. The computer program product according to claim 18, wherein determining the second segment access level of the second segment comprises:

determining a first weight for the first segment access level;

determining a second weight for the second segment count; and determining the second segment access level based on the first weight, the first segment access level, the second weight, and the second segment count.

20. The computer program product according to claim 17, wherein determining the access level threshold comprises:

obtaining a predetermined low usage level threshold and a predetermined high usage level threshold of the storage space;

determining a current usage level of the storage space based on a currently used capacity and a total capacity of the storage space; and determining the access level threshold based on the low usage level threshold, the high usage level threshold, and the current usage level.

* * * * *